United States Patent [19]
Shear et al.

[11] 3,781,803
[45] Dec. 25, 1973

[54] COLLISION AVOIDANCE SYSTEM GROUND STATION SYNCHRONIZATION

[75] Inventors: Wayne G. Shear; Brendan J. Spratt, both of Pompano Beach; Benton J. McClure, Lighthouse Point, all of Fla.

[73] Assignee: The Bendix Corporation, Southfield, Mich.

[22] Filed: Apr. 10, 1972

[21] Appl. No.: 242,631

[52] U.S. Cl. ........................... 340/147 SY, 343/225
[51] Int. Cl. ............................................. H04l 7/08
[58] Field of Search ............. 343/225; 340/147 SY; 58/24–26; 325/58; 178/69.5

[56] References Cited
UNITED STATES PATENTS

| | | | |
|---|---|---|---|
| 3,185,963 | 5/1965 | Peterson et al. | 340/147 SY |
| 3,681,914 | 8/1972 | Loewengart | 340/147 SY |
| 3,541,552 | 11/1970 | Carlson | 340/147 SY |
| 3,109,897 | 11/1963 | Carbrey | 340/147 SY |

Primary Examiner—John W. Caldwell
Assistant Examiner—Marshall M. Curtis
Attorney—Bruce L. Lamb et al.

[57] ABSTRACT

A collision avoidance system ground station has its clock phase synchronized with a master clock through the use of a line-of-sight radio link. Multiple two-way synchronization rangings are exchanged between the ground station and the master clock. A digital counter at the ground station obtains the average deviation of the ground station clock with respect to the master clock and applies this average deviation to calibrate or synchronize the ground station clock with the master clock. Subsequently, further multiple two-way synchronization rangings are exchanged between the ground station clock and the master clock. A digital counter at the master clock now obtains the average deviation of the master clock with respect to the ground station clock as a check of the validity of the ground station clock calibration.

4 Claims, 4 Drawing Figures

COLLISION AVOIDANCE SYSTEM GROUND STATION SYNCHRONIZATION

BACKGROUND OF THE INVENTION

This invention relates to means for calibrating a network of time sources at locations remote from one another and it particularly relates to means for calibrating the ground stations needed to make practical a collision avoidance system utilizing the so-called master time technique. In this type of collision avoidance system each cooperating aircraft is equipped with an accurate clock, which suitably includes either an atomic or a very accurately controlled crystal frequency source, which is synchronized with all other airborne clocks in a given anti-collision net. A network of synchronized ground clocks provides overall system continuity. The aforementioned collision avoidance system makes use of a system epoch which is divided into equally spaced time slots, each aircraft in the collision avoidance network occupying a separate time slot. The importance of maintaining clocks within this type of collision avoidance network in accurate calibration is seen in the fact that collision avoidance messages are transmitted one way during the time slot assigned to a particular aircraft. The aircraft transmits on a precisely defined carrier frequency assigned to its time slot a collision avoidance message generally containing information as to its range, range rate and altitude. A cooperating aircraft which receives this message determines the range of the transmitting aircraft by comparing the time of receipt of the message with the beginning of the time slot as determined by the clock on the receiving aircraft. It can thus be seen that small errors in time will result in large errors of range.

It is proposed that airborne clocks be started and time synchronized in large terminal areas by reference to ground stations operating on a single worldwide time. It is additionally proposed that airborne stations while within the area of ground station influences maintain their clocks synchronized with the ground stations by a two-way ranging technique of the type well known to those skilled in this art.

Ground stations use one or more clocks of great accuracy, typically parts in $10^{12}$, to maintain the required system continuity. In spite of this extreme accuracy of the ground station clocks, the necessary parameters of a practical collision avoidance system as determined by the limitations of the two-way ranging technique whereby airborne stations are synchronized with the ground stations require that the ground station clocks maintain accuracy in the order of half a microsecond. To maintain this type of accuracy ground station clocks need to be calibrated approximately every 2 weeks.

Experience has shown that calibration of fixed ground station clocks with respect to master clocks via long range radio frequency links is generally unsatisfactory due to problems of signal propagation and ground station siting. The calibration accuracy required demands that actual visits be made by a master clock to the ground station to establish the required time accuracy.

Because of problems such as pulse rise time, equipment jitter and multipath interference it has been suggested that the two-way ranging technique whereby ground stations will calibrate airborne stations will not be sufficiently precise to permit an airborne clock to re-calibrate the ground station. It has thus been further suggested that the master clock be landed in close proximity to the ground station to permit the required calibration to take place. This type of calibration procedure is more expensive and time consuming than would be required if a simple fly-by of the airborne clock could be used for the calibration.

SUMMARY OF THE INVENTION

The invention described below provides a method and means for calibrating a collision avoidance system ground station with respect to an airborne master clock via line-of-sight two-way ranging techniques without landing the master clock. The aforementioned two-way ranging techniques are currently being used in the collision avoidance system and are well known to those skilled in the art. Briefly, as used in the collision avoidance system, an aircraft requesting synchronization of its clock with a remote clock located in the donor, either a ground station or an airborne station, includes as part of its collision avoidance message a synchronization request at a predetermined point in its time slot. As well known to those skilled in the art, the geometry of the synchronization scheme just described is such that if the synchronization response is received by the aircraft requesting synchronization exactly at the predetermined point in the time slot the clock on the aircraft requesting synchronization and the clock on the donor are exactly synchronized with one another. Any time deviation of the reception of the synchronization response at the aircraft requesting synchronization from the predetermined point is a measure of the out of synchronization of the clock on the aircraft requesting synchronization with respect to the clock on the donor. An aircraft requesting synchronization will thus be able to synchronize its clock with the donor's clock if it so desires.

In the present invention, the ground station requests synchronization from an airborne master station which includes a master clock.

In its more sophisticated form, the operation of the invention may be summarized as follows. An aircraft equipped as a donor is flown in close proximity to the ground station. The donor suitably transmits a standard collision avoidance message during its assigned time slot and includes therein a code identifying the ground station. The ground station upon receiving and deciphering the code automatically assumes a calibration mode. During subsequent time slots, the ground station requests synchronization from the donor in an essentially identical manner as airborne collision avoidance system stations normally request synchronization from a donor. For each synchronization request made the donor transmits a synchronization response.

A plurality of such synchronization messages are exchanged between the ground station and the donor with the time deviation of the receipt of the synchronization response at the ground station with respect to the aforementioned predetermined point being recorded in a digital counter. At the completion of a predetermined number of such synchronization exchanges the average deviation is extracted from the counter and used to phase correct the ground station clock. Subsequently, a further plurality of synchronization messages are exchanged between the donor and the ground station with the original donor requesting synchronization. The deviation is recorded and displayed at the original donor as a check of the validity of the ground station calibration.

Since an average error is obtained from a plurality of synchronization messages random errors such as those caused by pulse rise time, equipment jitter and multipath interference are effectively cancelled out.

It is thus an object of this invention to provide means for maintaining a ground station operating in a time ordered community in accurate calibration.

It is a further object of this invention to provide means whereby an airborne master clock may be used to maintain a ground station clock in required calibration without the need for landing the master clock.

These and other objects of the invention will be made apparent as the description of the preferred embodiment proceeds.

BRIEF DESCRIPTION OF THE DRAWINGS

FIGS. 3A and 3B are time graphs illustrating the reception of synchronization responses in the time slot of the station requesting synchronization.

DESCRIPTION OF THE PREFERRED EMBODIMENT

Figure 1:
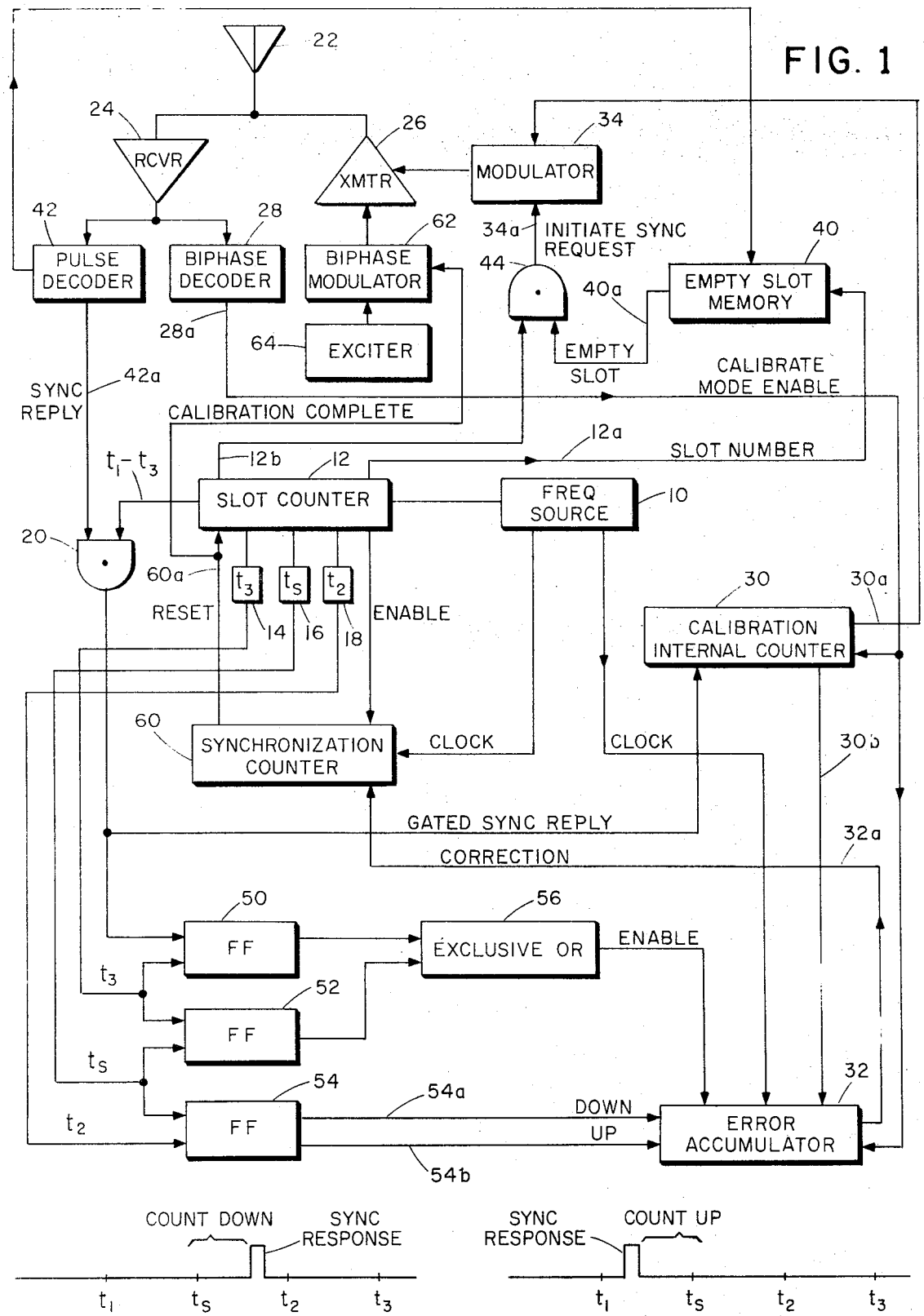
FIG. 1 is a block diagram illustrating an embodiment of the ground station portion of the invention.

Referring first to FIG. 1 it can be seen that a ground station includes a frequency source 10 which derives its accuracy from an extremely accurate and stable frequency signal such as that generated by a cesium beam standard. One output of frequency source 10 consists of clocking pulses having a predetermined pulse repetition frequency and which are applied to slot counter 12. It is assumed that slot counter 12 has previously been started and synchronized with respect to a master time reference. The slot counter comprises the ground station clock and is suitably comprised of a binary counter which counts the clocking pulses applied thereto to keep a count of the length and number of time slots in the collision avoidance epoch. Timing gates 14, 16 and 18, also familiar to those skilled in the art, are provided to sense the state of counter 12 and to generate signals at time $t_3$, $t_s$ and $t_2$, respectively, with respect to each time slot. Counter 12 also generates a signal at $t_1$ with respect to the time slot and which is applied as one input to AND gate 20. This latter signal is extinguished at time $t_3$.

The ground station additionally includes an antenna 22 for transmitting and receiving synchronization messages. The antenna is connected to the input of a receiver 24 and is further connected to receive the output signal from a transmitter 26.

The ground station might enter the calibration mode in one of several ways. For instance, the calibration mode can be manually initiated from the ground or automatically initiated from the airborne donor station which is to provide calibration. In the embodiment described, the ground station enters the calibration mode upon command from the donor station. This is accomplished as follows. The standard collision avoidance system time slot is 1500 microseconds long. The standard collision avoidance message is transmitted during a time slot and includes a 200 microsecond long range pulse which has provisions for 120 biphase data bits. A few of these data bits are preempted by the donor station to include a preassigned address code and parity check unique to the ground station. Antenna 22 intercepts the message from the donor and the message is processed by receiver 24. If the address code identifying this particular ground station is detected by decoder 28 it thereupon generates an output signal at line 28a which is applied to reset calibration interval counter 30 and error accumulator counter 32. Counter 30 counts the number of synchronization messages exchanged between the ground station and the donor and counts from a zero count to a maximum count at which time it stops until reset. Counter 30 generates an output along line 30a to thus energize modulator 34 whenever counter 30 is not at its maximum count. When the counter is at its maximum count the signal on line 30a is extinguished. Modulator 34 is energized by the signal on line 30a so that it can thereafter respond to signals at input port 34a as will be explained more fully below.

It will be remembered that slot counter 12 keeps a count of the slots within an epoch as well as the timing within each individual time slot. Counter 12 communicates the instantaneous slot number via line 12a to empty slot memory 40. Pulse decoder 42, in addition to recognizing synchronization response as will be explained also recognizes whether a normal range pulse from other aircraft is received at the ground station. If a range pulse is received, this information is communicated to empty slot memory 40 which records that information with the slot number. If a range pulse is not received during a particular time slot, memory 40 takes note of this fact. When that time slot, during which a range pulse was not previously received, reoccurs memory 40 generates an output signal along line 40a. Line 40a is connected as one input to AND gate 44. In addition, slot counter 12 generates an output on line 12b at a predetermined point in each time slot. Line 12b is connected as the second input to gate 44. Thus, at a predetermined point in each empty time slot, gate 44 opens and a signal is applied therefrom to terminal 34a of modulator 34. If the ground station is now in the calibration mode, that is if modulator 34 is energized by the signal on line 30a, modulator 34 will trigger transmitter 26 to generate a synchronization request via antenna 22. The aforementioned predetermined point in the time slot is a point time spaced, with respect to the beginning of the time slot such that the ground station will transmit a sychronization request at the proper time.

Since, as will be explained, a plurality of synchronizations from the airborne master clock are required to calibrate the ground station, the use of each empty time slot to exchange synchronization messages will speed the calibration process. Of course, if less than each empty time slot is used to exchange synchronization messages the calibration time will be correspondingly longer.

As previously discussed and as well known to those skilled in the art a donor station upon receipt of the synchronization request will generate a synchronization response after a delay, the length of which is determined by the time of receipt of the synchronization request at the donor station with respect to the beginning of the time slot as determined by donor's clock. This delay period is such that if the donor's clock and ground station clock are exactly synchronized the response will be received at the ground station at a predetermined time $t_s$, measured with respect to the beginning of the time slot at the ground station. A synchronization response received before or after $t_s$ indicates the ground station is not synchronized with the donor station and the deviation from $t_s$ is a measure of the out-of-synchronization. A more exhaustive description of the two-way synchronization technique can be found in U. S. Pat. No. 3,568,186.

The graphs of FIGS. 3A and 3B are useful in explaining the operation of the invention and reference to these figures should now be made. These figures represent a portion of the time slot during which the ground station is expecting synchronization. There is seen a time $t_s$. If a synchronization response is received at $t_s$ it is known that the ground station clock is synchronized exactly with the donor clock. FIG. 3A shows the condition where the synchronization response is received after $t_s$ and FIG. 3B shows the situation where the synchronization response is received before $t_s$. In both cases, the time between $t_s$ and the receipt of the synchronization response is a measure of the out-of-synchronization of the ground station clock with respect to the donor. There is also shown a time $t_1$ which occurs a predetermined time period before $t_s$ and a time $t_2$ which occurs an identical time period after $t_s$. In this embodiment, a synchronization response must be received between times $t_1$ and $t_2$ in order to be considered. A third time $t_3$ occurs the same time after $t_2$ as $t_2$ occurs after $t_s$.

Returning to FIG. 1 slot counter 12 generates a signal at time $t_1$ which is applied as one input to AND gate 20. The signal at $t_1$ suitably remains on until time $t_3$ when it is extinguished and then regenerated at time $t_1$ in the next time slot. Pulse decoder 42 considers all messages received at the ground station. If a particular message includes a synchronization response decoder 42 generates an output on line 42a which is applied as the second input to gate 20. If this response is received after $t_1$ and before $t_3$ gate 20 will open and a pulse is applied to counter 30 indicating that a synchronization response has been received.

A steering network for entering a number proportional to the deviation of the synchronization response with respect to $t_s$ is comprised of flip flops 50, 52 and 54 and exclusive OR gate 56. The set input terminal of flip flop 50 is connected to receive the output signals from gate 20. The $t_3$ signal from gate 14 is connected to the reset input terminal of flip flop 50 and to the set input terminal of flip flop 52. The $t_s$ signal from gate 16 is connected to the reset input terminal of flip flop 52 and to the set input terminal of flip flop 54. The $t_2$ signal from gate 18 is connected to the reset input terminal of flip flop 54. The set output signal from flip flop 50 together with the reset output signal from flip flop 52 are applied as inputs to exclusive OR gate 56. Counter 32 which when enabled accumulates pulses from frequency source 10 is controlled by the aforementioned steering circuitry. In particular, when flip flop 54 is in the set state the resultant output on line 54a causes the pulses applied to counter 32 to subtract from the count already contained therein. When flip flop 54 is in the reset state, the resultant output on line 54b causes the pulses applied to counter 32 to add to the count already contained therein.

The operation of the steering circuit is as follows, assuming initially that flip flops 50 and 54 are in the reset state, flip flop 52 is in the set state and counter 32 has been reset to some initial state indicative of zero error or deviation. Assume also that a signal is now received from gate 20 between $t_1$ and $t_s$ as illustrated in FIG. 3B. Flip flop 50 will be toggled to the set state to thus apply an input to exclusive OR gate 56. Remembering that flip flop 52 at this time is in the set state, it can be seen that gate 56 will now generate an output to enable counter 32 to be receptive to pulses received from frequency source 10. Remembering also that flip flop 54 at this time is in the reset state, the pulses entering counter 32 will be added to the number already contained therein. The next signal received will of course be the $t_s$ signal which will reset flip flop 52 thus closing gate 56 to disable counter 32, that is, to render the counter unresponsive to applied clock pulses from source 10. The count added to the counter 32 is proportional to the time between the receipt of the synchronization response and $t_s$. The $t_s$ signal also sets flip flop 54. However, since counter 32 is disabled, the DOWN signal now generated by flip flop 54 will be ineffective. The next signal generated during this particular time slot is the $t_2$ signal which will reset flip flop 54. The last signal to be generated during this particular time slot is the $t_3$ signal which will reset flip flop 50 and set flip flop 52, thus maintaining gate 56 closed and the counter disabled. Thus, in the case where the synchronization response is received after $t_1$ but before time $t_s$, counter 32 will have entered therein a count proportional to the time difference between $t_s$ and the synchronization response, that is a count proportional to the out-of-synchronization of the ground station clock with respect to the donor clock.

In the case where the synchronization response is received between $t_s$ and $t_2$ as illustrated in FIG. 2A the operation of the steering circuit is as follows. As before, flip flops 50 and 54 are initially in the reset state while flip flop 52 is in the set state. In this case, the first signal of interest generated is $t_s$ which toggles both flip flops 52 and 54. The reset signal now applied to gate 56 opens that gate to enable counter 32. Additionally, the set signal from flip flop 54 applies a DOWN signal to the counter so that pulses from frequency source 10 are subtracted from the count originally contained in counter 32. The next signal received is the synchronization response generated by gate 20. This signal will set flip flop 50 whose resultant output signal will close gate 56 to thus disable the counter. Later received signals $t_2$ and $t_3$ will return the flip flops to their initial condition without affecting the count contained in counter 32.

It should be realized that if a synchronization signal is not received before time $t_2$ a count proportional to the entire time between $t_s$ and $t_2$ will be subtracted from counter 32 and this will constitute an invalid operation upon the counter. It is thus necessary in this case to restore the counter to a condition that existed before the pulses were subtracted therefrom. Since no synchronization response is received the signal received after the $t_s$ signal will be the $t_2$ signal which will trigger flip flop 54 to the reset state to thus generate the UP signal which is applied to counter 32. Since gate 56 is still open, the pulses applied to the counter from frequency source 10 will now be added therein until the $t_3$ signal is generated, at which time flip flop 52 is triggered into the set state to thus extinguish its reset output signal previously applied to gate 56, closing that gate and disabling the counter. Thus, the same number of clock pulses are entered into counter means 86 as were previously removed therefrom, restoring the counter to its previous condition.

It will be remembered that calibration interval counter 30 counts the number of synchronization replies received. Since, as previously mentioned, counters 30 and 32 comprise binary counters it is merely necessary to sense certain of the most significant bits in counter 32 after the correct number of synchronization replies have been sensed by counter 30 in order to compute the average number of pulses added or subtracted from counter 32 during the calibration interval. To accomplish this, the number of bits comprising counter 30 is made identical to the number of least significant bits ignored in taking the average count contained in counter 32. For example, if counter 30 contains eight bits so that it attains a maximum count every 128 synchronization responses received, it is merely necessary to ignore the first eight least significant bits of counter 32 and to consider only the subsequent most significant bits to determine the average number of pulses added to counter 32 over the calibration interval of 128 synchronization responses.

Counter 32 comprises a combined binary synchronous counter and shift register. During the calibration interval, which is here assumed to be 128 synchronization responses, the counter functions as a binary counter with the contents of the counter being accumulated clock pulses the total number of which is proportional to the synchronization error of the ground station clock with respect to the master clock taken over the calibration interval. Upon receipt of the 128th synchronization response calibration interval counter 30 attains its maximum count and generates an output via line 30b which is applied to counter 32. This changes the mode of counter 32 from count to shift, and the resident binary number is shifted right eight places. During the shift operation, counter 30 is time shared to track the number of shifts and terminate the shift operation after the eighth shift. At this time, counter 32 may revert to the counter mode and serially add or subtract pulses to the synchronization counter 60. Alternately, the contents of the counter 32 may be loaded broadside, that is parallel-by-bit, into synchronization counter 60 using 2's complement representation for negative numbers. The means for shifting the information from counter 32 into synchronization counter 60 is represented by line 32a.

If the timing errors are such that the ground station timing is early, counts are subtracted from synchronization counter 60 or if the parallel load technique is used, the correction term will be in the 2's complement form. For late timing errors, the converse is true, and the counts are added serially to synchronization counter 60 or loaded parallel depending on the technique used. Correction of the ground station time base (slot counter 12) is then accomplished by a single reset pulse provided by the synchronization counter 60 which has been adjusted in accordance with the average error computed over the preceding 128 synchronization replies.

It should be noted that the normal operation of the ground station, that is, the providing of synchronization responses to aircraft within communication range when requested, is in no way affected by the calibration process just described. As well known to those skilled in the art, synchronization counter 60 comprises a normal portion of the ground station equipment and is used for providing the aforementioned synchronization responses when requested. Although not shown for simplicity, the decoding by the ground station of a synchronization request in an occupied time slot will initiate normal synchronization reply in that time slot. This is accomplished by the well known means, using the synchronization counter 60. As mentioned above, the time base as maintained by slot counter 12 is corrected only once, after the calibration interval is complete. The affect on the normal ground station synchronization process is simply that more accurate synchronization is not provided to the airborne community after calibration of the ground station.

As previously mentioned the completion of the calibration interval is signaled when counter 30 reaches its maximum count at which time its signal on line 30a is extinguished. Accordingly, modulator 34 is deenergized so that the ground station ceases transmission of synchronization requests. In addition, at the resetting of the slot counter 12 by synchronization counter 60 via line 60a, which resetting time is at the beginning of a time slot, the reset pulse is also applied to a further modulator 62 which receives carrier frequencies from exciter 64 so as to key transmitter 26 to transmit via antenna 22 a message modulated to contain information that the calibration interval is complete at the ground station.

Figure 2:
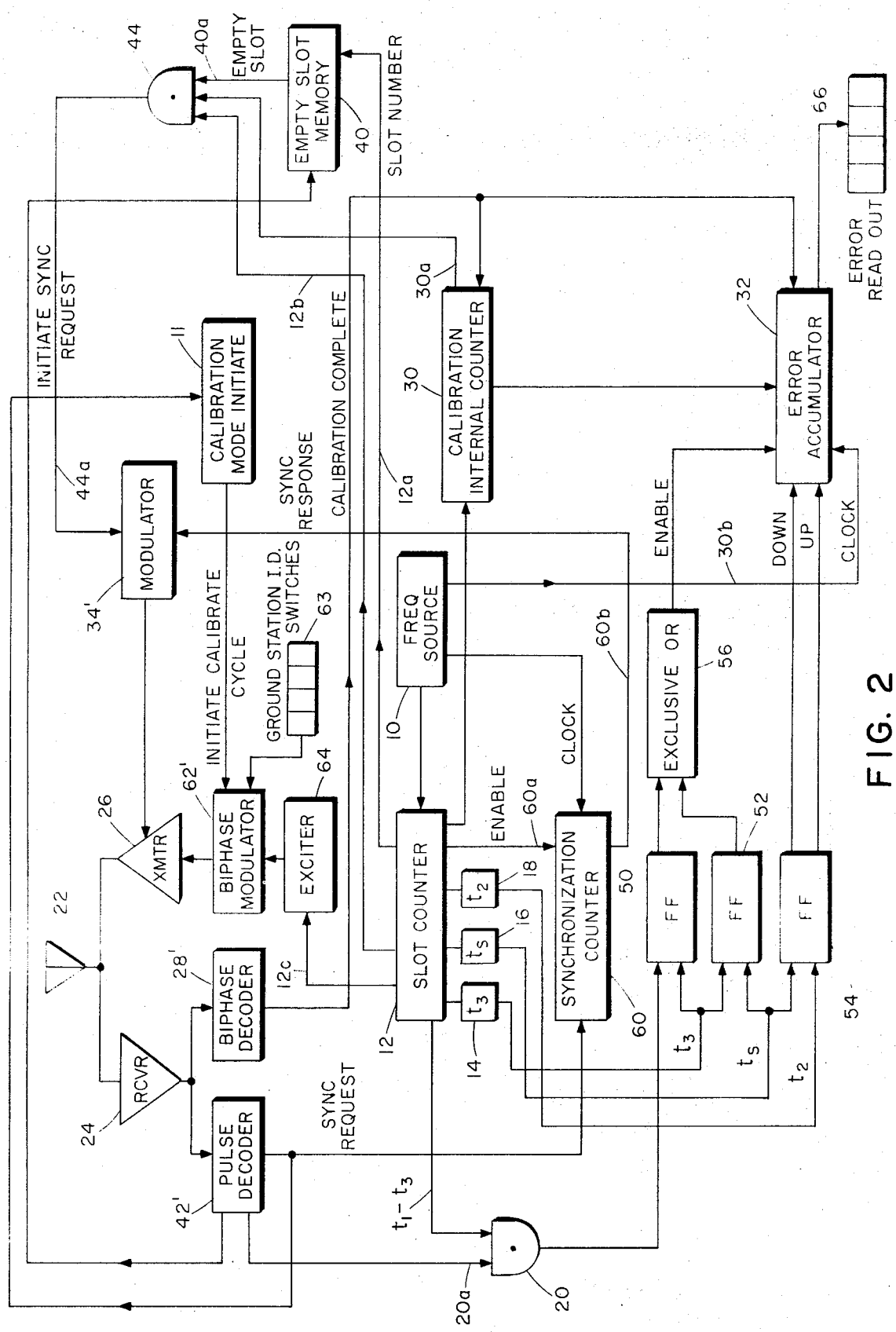
FIG. 2 is a block diagram illustrating an embodiment of the airborne portion of the invention.

Refer now to FIG. 2 which is a block diagram of the airborne station containing the master clock. Suitably identical elements are marked with the same reference numerals as used in FIG. 1 while those elements which are essentially identical to those elements in the ground station but which may be set to respond to or to generate a different code are marked with a prime ('). The airborne station includes a frequency source 10 and a master clock in the form of slot counter 12 which will be used to calibrate the ground station. As before, the slot counter keeps a count of the length and number of the time slots in the collision avoidance system epoch. The airborne station also includes a calibration interval counter 30 which generates an output along line 30a only when it is not at its maximum count. Line 30a communicates with one input to AND gate 44 and hence that gate remains closed so long as counter 30 remains at its maximum count. It is assumed now that calibration interval counter 30 is at its maximum count and stopped, hence gate 44 is closed. It is additionally assumed that the airborne station is approaching the vicinity of the ground station prior to actual calibration. Switches represented at 63 may be set to a code identifying this particular ground station, this code being set into biphase modulator 62'. A latching switch, suitably manually operated, represented at 11 is actuated to apply an enabling signal to modulator 62'. At the beginning of the airborne station's own time slot a source of carrier frequency, exciter 64, is turned on by the signal from slot counter 12 applied via line 12c. As a result, a signal modulated by modulator 62' to include the identification of the ground station is transmitted by transmitter 26 via antenna 22. It will be remembered that upon receipt of this particular coded message the ground station will subsequently transmit a uniquely coded synchronization request at the next empty time slot. This message from the ground station is intercepted by antenna 22 and receiver 24 and deciphered in pulse decoder 42'. The received synchronization request is now applied to latching switch 11 to thereby unlatch that switch and is also applied to synchronization counter 60. The operation of the synchronization counter is identical to that known in the prior art and will not be explained here. Briefly, in the known synchronization counter the counter is informed of the beginning of a time slot by a signal from slot counter 12 applied at terminal 60a. Synchronization counter 60 immediately begins counting at a first predetermined rate. Upon receipt of a synchronization request, the count rate shifts to a different rate, normally one-half the previous rate. Counting at the second rate continues until a predetermined count is reached at which time a synchronization response is initiated by a signal on line 60b which is applied to modulator 34' so that a uniquely coded synchronization response is transmitted. The airborne station continues to respond to further synchronization requests received from the ground station. It will be remembered that at the completion of the calibration interval the ground station transmits another uniquely coded message indicating that the calibration interval is complete. This message is intercepted by the airborne station and deciphered by decoder 28'. The resultant output signal from decoder 28' resets calibration interval counter 30 and error accumulator 32. Since counter 30 is no longer at its maximum count, it generates an output on line 30a which allows gate 44 to open. The empty slot memory 40 together with slot counter 12 permit synchronization requests to be made at each empty time slot. The manner in which this is accomplished is identical to that previously described with respect to the ground station. Briefly, at the proper time in the time slot counter 12 applies a signal via line 12b to gate 44. If that time slot is unoccupied memory 40 also applies a signal to gate 44 via line 40a. The gate thus opens and excites modulator 34' via line 44a to transmit a synchronization request. The resultant responses from the ground station are deciphered by decoder 42' and applied at gate terminal 20a. The time arrival of the synchronization responses from the ground station at the airborne station are compared against time $t_s$ as determined by the master clock. The means for making this comparison is suitably identical to that used in the ground station and is comprised of gates 14, 16 and 18, error accumulator counter 32 and the steering network comprised of flip flops 50, 52 and 54 and exclusive OR gate 56.

When calibration interval counter 30 reaches its predetermined maximum count the signal on line 30a is extinguished thus closing gate 44 and terminating the calibration procedure. A signal from counter 30 at its maximum count is also suitably applied to counter 32 to cause it to read out its contents in some utilization unit such as display 66 for validation of the ground station calibration.

The invention claimed is:

1. A multiple unit system wherein each unit includes clock means intended to be operated in synchronism with a system-wide sequence of repeating cycles of time slots, said units additionally including means for synchronizing said clock means with one another by a two-way ranging technique wherein a unit requesting synchronization receives a synchronization signal the time of arrival of which at said unit requesting synchronization is a measure of the individual synchronization error existing between the unit requesting synchronization and a unit transmitting said synchronization signal as observed at said unit requesting synchronization and wherein one said unit includes a mobile master unit and another unit includes local clock means responsive to a local accurate frequency source for establishing said system-wide sequence of repeating cycles of time slots, said another unit additionally comprising:

means for obtaining from said master unit a synchronization signal during each of a plurality of said time slots;

means responsive to each of said synchronization signals as received at said unit requesting synchronization for generating a number of clock pulses related to said individual synchronization error;

first counter means for cumulating said clock pulses;

second counter means for keeping a count of the number of said synchronization signals received by said unit requesting synchronization and for generating an output signal when it attains a predetermined count;

means responsive to said output signal for extracting the average of the instantaneous count contained in said first counter means; and, means responsive to said average for calibrating said local clock means.

2. The system of claim 1 wherein said another unit additionally includes:

means responsive to the calibration of said local clock means for transmitting a second signal from said another unit to siad master unit, said second signal containing uniquely coded information indicating calibration of said local clock means is complete.

3. The system of claim 2 wherein said master unit additionally includes:

means responsive to said second signal for obtaining a plurality of synchronization signals from said another unit; and, means responsive to said plurality of synchronization signals for calculating the error of said local clock.

4. The system of claim 1 wherein said means for obtaining comprises:

means for memorizing which time slots are unoccupied;

means cooperating with said means for memorizing for transmitting synchronization requests in a plurality of unoccupied time slots, said master unit responding to each said synchronization request with a synchronization signal.

* * * * *